United States Patent
Muller et al.

(10) Patent No.: US 10,750,101 B2
(45) Date of Patent: Aug. 18, 2020

(54) RESOLUTION FOR AUTOSTEREOSCOPIC VIDEO DISPLAYS

(71) Applicant: Soliddd Corp., Brooklyn, NY (US)

(72) Inventors: Richard A. Muller, Berkeley, CA (US); Neal Weinstock, Brooklyn, NY (US)

(73) Assignee: SOLIDDD CORP., Brooklyn, NY (US)

(*) Notice: Subject to any disclaimer, the term of this patent is extended or adjusted under 35 U.S.C. 154(b) by 479 days.

(21) Appl. No.: 15/382,674

(22) Filed: Dec. 18, 2016

(65) Prior Publication Data
US 2017/0195580 A1     Jul. 6, 2017

Related U.S. Application Data

(63) Continuation-in-part of application No. 12/969,552, filed on Dec. 15, 2010.

(51) Int. Cl.
*H04N 5/265* (2006.01)
*G02B 30/24* (2020.01)
(Continued)

(52) U.S. Cl.
CPC ............ *H04N 5/265* (2013.01); *G02B 30/24* (2020.01); *G02B 30/25* (2020.01); *G02B 30/27* (2020.01);
(Continued)

(58) Field of Classification Search
CPC .... H04N 5/265; H04N 13/229; H04N 13/305; H04N 13/354; H04N 13/302; G02B 27/26; G02B 27/2264; G02B 27/2214
See application file for complete search history.

(56) References Cited

U.S. PATENT DOCUMENTS 10,531,070 B2 * 1/2020 Urey .................... G03B 21/602
2006/0170834 A1 8/2006 Kim et al.
(Continued)

FOREIGN PATENT DOCUMENTS

CN    101836460 A    9/2010
CN    102346307 A    2/2012
(Continued)

OTHER PUBLICATIONS

Penchev, Petyo, International Search Report for PCT/US2017/066333, 5 pages.

*Primary Examiner* — Joseph W Becker
(74) *Attorney, Agent, or Firm* — Ference & Associates LLC

(57) ABSTRACT

A single pixel of a video display can display respective individual pixels of multiple views. In other words, a video display can include more views for an autostereoscopic image than the physical pixels of the video display would ordinarily support. The physical pixel is time-multiplexed in that the physical pixel displays a pixel of one view for a given time interval and a view multiplexer deflects the light from the physical pixel by a predetermined angle to make the pixel appear in a location corresponding to the pixel of the view. In another time interval, the physical pixel displays a pixel of a different view and the view multiplexer deflects light from the physical pixel by a different predetermined angle to make the pixel appear in a location corresponding to the pixel of the different view.

14 Claims, 8 Drawing Sheets

(51) Int. Cl.
    *H04N 13/302*     (2018.01)
    *H04N 13/305*     (2018.01)
    *H04N 13/229*     (2018.01)
    *H04N 13/354*     (2018.01)
    *G02B 30/25*     (2020.01)
    *G02B 30/27*     (2020.01)

(52) U.S. Cl.
    CPC ......... *H04N 13/229* (2018.05); *H04N 13/302* (2018.05); *H04N 13/305* (2018.05); *H04N 13/354* (2018.05)

(56) References Cited

U.S. PATENT DOCUMENTS

| | | | | |
|---|---|---|---|---|
| 2011/0242287 | A1* | 10/2011 | Cieslinski | G02B 27/2264 348/49 |
| 2012/0026161 | A1* | 2/2012 | Chen | G02B 5/06 345/419 |
| 2013/0258462 | A1* | 10/2013 | May | G02B 21/22 359/464 |
| 2015/0015685 | A1* | 1/2015 | Muller | G02B 27/2264 348/55 |
| 2017/0150045 | A1* | 5/2017 | Goswami | H04N 5/2254 |
| 2017/0195580 | A1* | 7/2017 | Muller | H04N 5/265 |
| 2018/0033356 | A1* | 2/2018 | Zhou | G09G 3/007 |

FOREIGN PATENT DOCUMENTS

| | | | |
|---|---|---|---|
| EP | 1513352 A1 | 3/2005 | |
| TW | 201416708 A | 5/2014 | |
| WO | 0045608 A1 | 8/2000 | |
| WO | WO-0045608 A1 * | 8/2000 | ............ G02B 5/32 |
| WO | 0198816 A1 | 12/2001 | |
| WO | 2009044334 A1 | 4/2009 | |
| WO | 2017160367 A1 | 9/2017 | |

* cited by examiner

RESOLUTION FOR AUTOSTEREOSCOPIC VIDEO DISPLAYS

FIELD OF THE INVENTION

The present invention relates generally to autostereoscopic displays, and, more particularly, to a video autostereoscopic display with significantly improved resolution.

BACKGROUND OF THE INVENTION

Conventional autostereoscopic displays use arrays of lenses or parallax barriers or other view selectors to make a number of pixels of the display visible to one eye of a viewing person and to make a number of other pixels of the display visible to the other eye of the viewing person. By isolating the pixels of the display visible to each eye, the two components of a stereoscopic image can be presented on the display.

Since an ordinary viewer's eyes are side-by-side and aligned horizontally, the array of lenses makes pixels visible according to horizontal orientation. As a result, corresponding pixels for the left and right eyes are located in the same scanline and displaced from one another horizontally.

Each eye of the viewer therefore sees an image whose horizontal resolution is halved in an autostereoscopic displays having only two views. In most autostereoscopic displays, field of view is improved by having more than just two views. In attempts to provide greater perceived depths of projection, many more views—e.g., 24 views—are required within a relatively narrow space—e.g., 1 mm. A typical LCD display screen has a pixel density of about 200 pixels per inch, though some have densities approaching 300 pixels per inch. That's approximately 6 pixels per millimeter, i.e., about one quarter of the resolution required to provide 24 views in a 1 mm space.

Thus, conventional video display devices are incapable of providing enough views in a sufficiently small space to satisfy the demands of modern autostereoscopic images.

SUMMARY OF THE INVENTION

In accordance with the present invention, a single pixel of a video display can display respective individual pixels of multiple views. In other words, a video display can include more views for an autostereoscopic image than the physical pixels of the video display would ordinarily support.

To achieve multiple views with a single physical pixel, the physical pixel is time-multiplexed. In particular, the physical pixel displays a pixel of one view for a given time interval and a view multiplexer deflects the light from the physical pixel by a predetermined angle to make the pixel appear in a location corresponding to the pixel of the view. In another time interval, the physical pixel displays a pixel of a different view and the view multiplexer deflects light from the physical pixel by a different predetermined angle to make the pixel appear in a location corresponding to the pixel of the different view.

The view multiplexer includes a number of columnar prisms of birefringent material such that deflection of light passing through the columnar prisms is switchable between two different angles by controlling the polarity of the light passing through. Alternatively, the material of the columnar prisms varies its refraction index according to an electrical field of the columnar prisms. An example of such a material is liquid crystal. The controllability of the reflection angles provided by the columnar prisms enables control of the location at which a given pixel appears to be to a human viewer.

By synchronizing the location at which a given pixel appears to be and the particular view displayed by the pixel allows that pixel to display pixels of multiple views for respective fractions of a frame rate. Persistence of vision of the human viewer causes the one pixel of the one view that is visible to the viewer through the lenticular array to continue to be perceived for the entire frame.

Multiple view multiplexers can be stacked to provide a wider variety of cumulative deflection angles.

In addition, focus errors due to curvature of field of the individual lenticles of a lenticular array are reduced by configuring the lenticles to focus at an acceptable distance behind the target of focus, e.g., the pixels of the autostereoscopic display. The result is that, due to curvature of field, the lenticles will focus particularly well at moderate angles of viewing perspective and will still produce acceptable focus errors and even wider angles of viewing perspective.

A BRIEF DESCRIPTION OF THE DRAWINGS

DETAILED DESCRIPTION OF THE INVENTION

Figure 1:
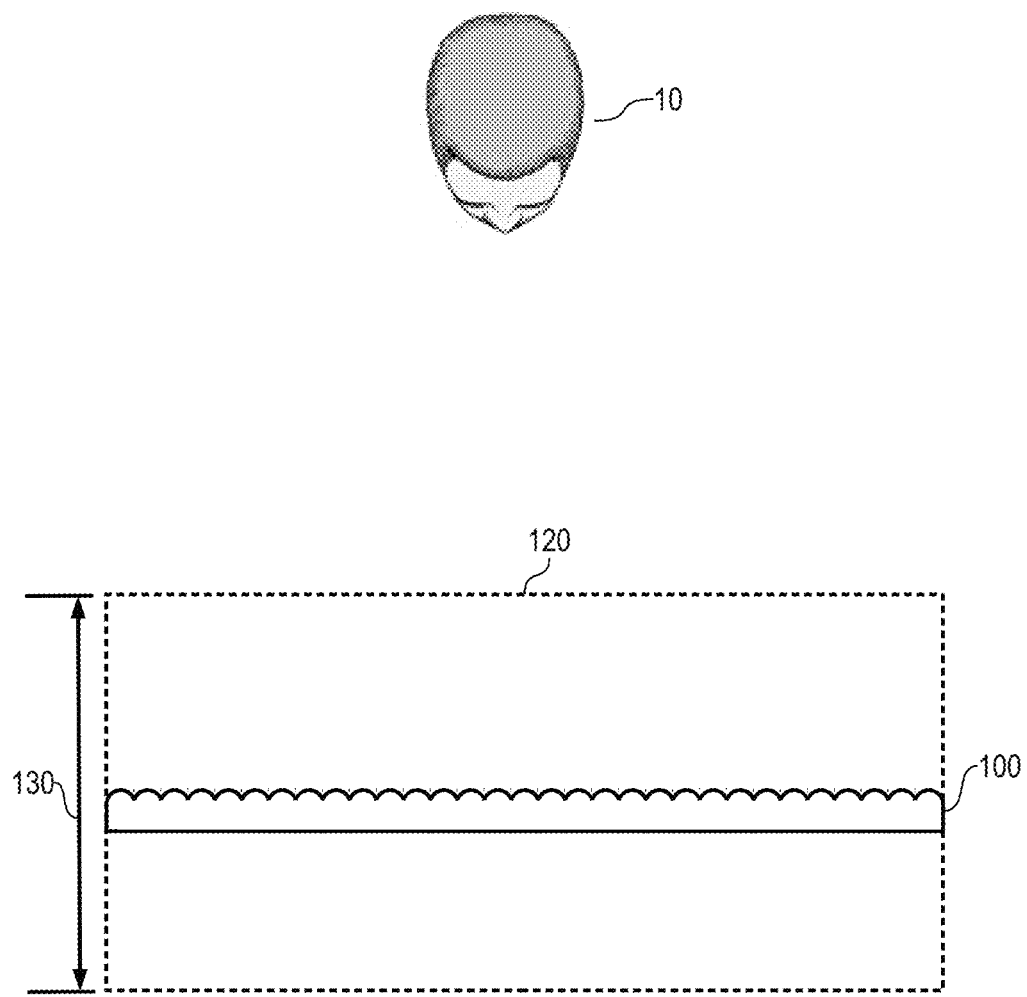
FIG. 1 is a plan view of a viewer and an autostereoscopic display in accordance with the present invention.
Figure 11:
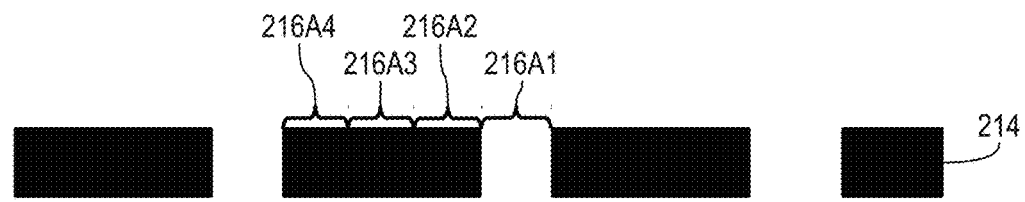
FIG. 11 is a plan view of the mask of FIG. 2 enlarged to illustrate locations of apparent pixels due to operation of view multiplexers of FIG. 2.

In accordance with the present invention, a single pixel of a video display can display respective individual pixels of multiple views. In particular, a stereoscopic display 100 (FIGS. 1 and 2) includes view multiplexers 204A-B (FIG. 2) that bend light from each of a number of pixels, such as pixels 216A-F, such that each pixel appears to be at a slightly different location and represents a pixel of a different view for each of a number of multiple time intervals. For example, view multiplexers 204A-B can cause pixel 216A to be at any of locations 216A1 (FIG. 11), 216A2, 216A3, and 216A4. In this manner, each of pixels 216A-F is time-multiplexed to represent pixels of respective multiple views of an autostereoscopic display.

In a manner described more completely below, view multiplexers 204A-B combine to provide 4-to-1 multiplexing in this illustrative embodiment. View multiplexers 204A-B bend light from pixels 216A-F at predetermined, fractional view angles at predetermined time intervals. In this illustrative embodiment, lenticle 202C is designed to provide a view angle increment of one degree, meaning that viewing perspectives through lenticle 202C at which each of pixels 216A-F is viewable through a mask 214 differ by one degree. To provide four (4) views from a single pixel, view multiplexers 204A-B combine to deflect light at four (4), evenly spaced, fractional view angles, namely, 0 degrees, 0.25 degrees, 0.5 degrees, and 0.75 degrees in this illustrative embodiment; other angles can be used in other embodiments. It should be appreciated that a single view multiplexer can provide two (2) views from a single pixel, three (3) view multiplexers can be combined to provide up to eight (8) views from a single pixel, and numerous other combinations can be implemented to provide even more views from a single pixel. It should be further appreciated that a view multiplexer can sweep across a range of deflection angles to provide other numbers of views from a single pixel in the manner described below.

Figure 4:
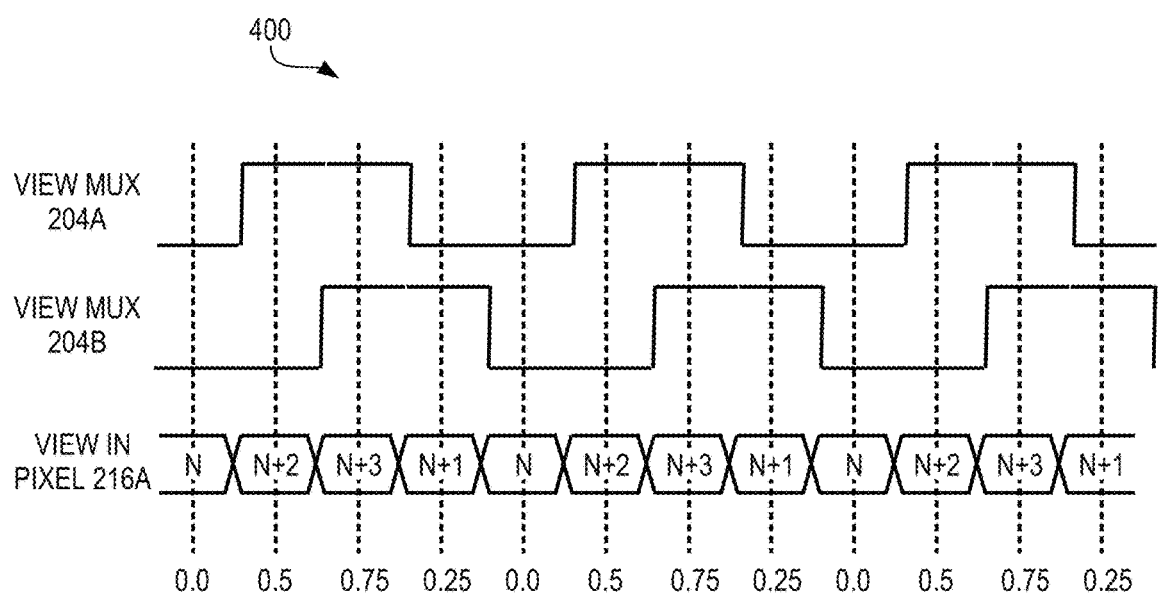
FIG. 4 is a timing diagram illustrating the time-multiplexing of a pixel using two (2) view multiplexers in accordance with the present invention.

Display of four (4) views using a single one of pixels 216A-F is shown in timing diagram 400 (FIG. 4). As described more completely below, view multiplexer 204A is switchable between deflecting light at 0.5 degrees or not deflecting light at all, and view multiplexer 204B is switchable between deflecting light at 0.25 degrees or not deflecting light at all. View multiplexers 204A-B switch at a rate of 120 Hz, and view multiplexer 204B follows view multiplexer 204. As by a lag of one-half clock cycle as shown in timing diagram 400.

Figure 2:
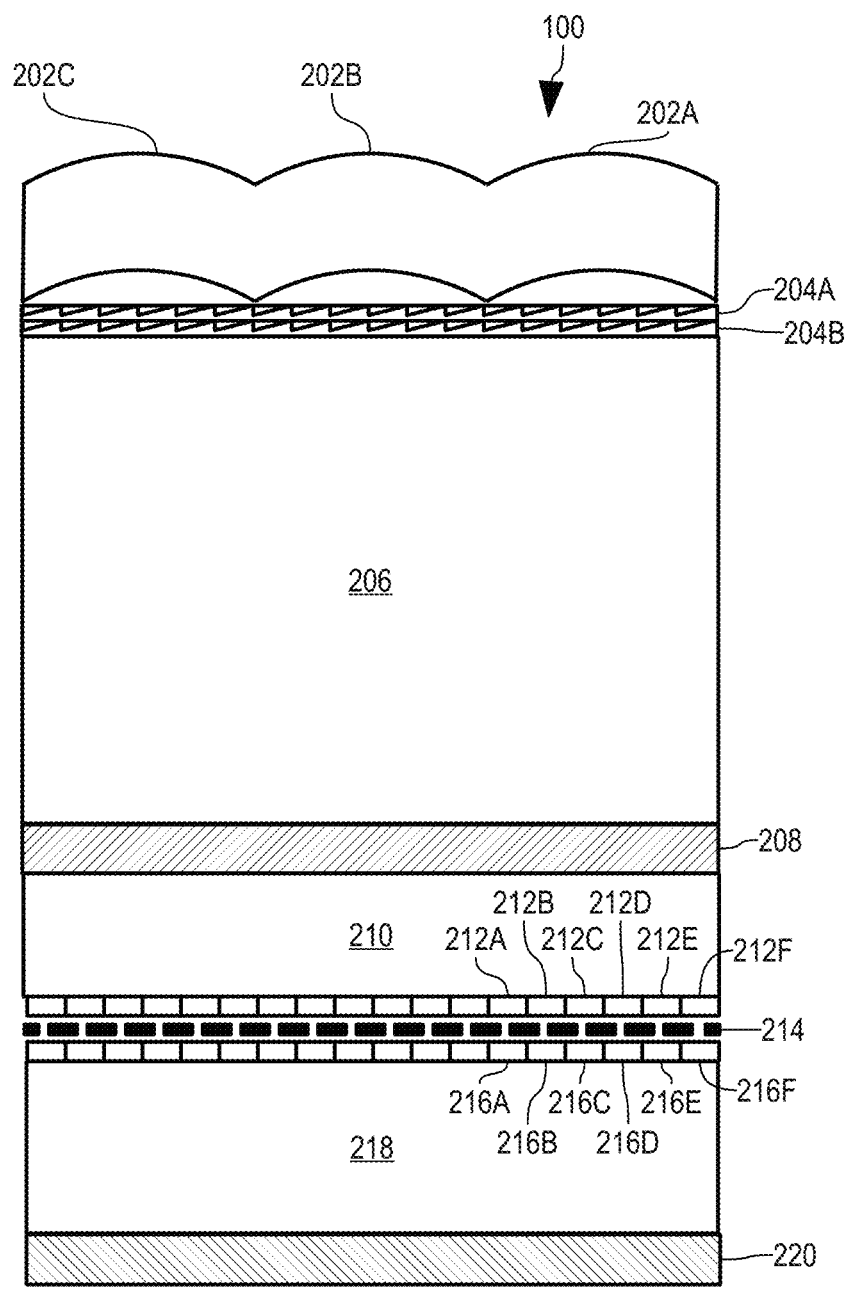
FIG. 2 is a plan view of a portion of the autostereoscopic display of FIG. 1 in greater detail.

Pixels 216A-F have a refresh rate of 240 Hz. Initially in timing diagram 400, view multiplexers 204A-B are both off, i.e., not deflecting light, and pixel 216A displays a pixel of view N for a single refresh cycle. If an eye of viewer 10 is aligned with pixel 216A through mask 214 and lenticle 202A, that eye will see view N of pixel 216A at location 216A1 (FIG. 11) and the pixel of view N will appear to occupy the entire width of lenticle 202A (FIG. 2). When pixel 216A is displaying pixels of other views, the deflection of view multiplexers 204A-B cause the eye to see flat black mask 214. However, the persistence of vision causes viewer 10 to continue to see the pixel of view N at location 216A1 (FIG. 11) for four (4) 240 Hz cycles.

In the next 240 Hz cycle (FIG. 4), view multiplexer 204A switches on. The cumulative deflection of view multiplexers 204A-B is 0.5 degrees, and pixel 216A appears to be at location 216A3 (FIG. 11) and displays a pixel of view N+2 (FIG. 4) for a single refresh cycle. If an eye of viewer 10 is 0.5 degrees from being aligned with pixel 216A through mask 214 and lenticle 202A, that eye will see view N+2 of pixel 216A and the pixel of view N+2 will appear to occupy the entire width of lenticle 202A. Mask 214 and the persistence of vision cause viewer 10 to continue to see the pixel of view N+2 at location 216A3 (FIG. 11) for four (4) 240 Hz cycles as described above.

In the next 240 Hz cycle (FIG. 4), view multiplexer 204B switches on. The cumulative deflection of view multiplexers 204A-B is 0.75 degrees, and pixel 216A appears to be at location 216A4 (FIG. 11) and displays a pixel of view N+3 (FIG. 4) for a single refresh cycle. If an eye of viewer 10 is 0.75 degrees from being aligned with pixel 216A through mask 214 and lenticle 202A, that eye will see view N+3 of pixel 216A and the pixel of view N+3 will appear to occupy the entire width of lenticle 202A. Mask 214 and the persistence of vision cause viewer 10 to continue to see the pixel of view N+3 at location 216A4 (FIG. 11) for four (4) 240 Hz cycles as described above.

In the next 240 Hz cycle (FIG. 4), view multiplexer 204A switches off. The cumulative deflection of view multiplexers 204A-B is 0.25 degrees, and pixel 216A appears to be at location 216A2 (FIG. 11) and displays a pixel of view N+1 (FIG. 4) for a single refresh cycle. If an eye of viewer 10 is 0.25 degrees from being aligned with pixel 216A through mask 214 and lenticle 202A, that eye will see view N+1 of pixel 216A and the pixel of view N+1 will appear to occupy the entire width of lenticle 202A. Mask 214 and the persistence of vision cause viewer 10 to continue to see the pixel of view N+1 at location 216A2 (FIG. 11) for four (4) 240 Hz cycles as described above.

In the next 240 Hz cycle (FIG. 4), view multiplexer 204B switches off. The cumulative deflection of view multiplexers 204A-B is 0 degrees, and pixel 216A again displays a pixel of view N and appears to be at location 216A1 (FIG. 11) for a single refresh cycle. And, the four (4) cycle pattern of timing diagram 400 (FIG. 4) repeats.

Thus, view multiplexers 204A-B time-multiplex pixels 216A-F such that each pixel can display a pixel of four (4) different views of autostereoscopic display 100. It should be appreciated that, without lenticles 202A-C, pixel 216A would appear to a human viewer to be four (4) distinct pixels at locations 216A1 (FIG. 11), 216A2, 216A3, and 216A4. Thus, without a lenticular array or other view selector, view multiplexers 204A-B cause a display to have an apparent resolution that is much more dense than the physical resolution of the display.

It should also be appreciated that there are alternatives to a lenticular array to ensure that a human viewer sees only one of the multiple views of an autostereoscopic image. For example, a parallax barrier can be used. In addition, using lasers rather than LCDs or LEDs as light sources allow the individual views displayed by a particular pixel to be only visible at locations to which the laser's light is directed.

As shown in FIG. 2, autostereoscopic display 100 includes a number of lenticles 202A-C of a lenticular array. In this illustrative embodiment, lenticles 202A-C are designed to provide a relatively flat field. Other approaches to minimize lenticle focus errors due to curvature of fields are described below.

View multiplexers 204A-B are immediately behind the lenticular array in this illustrative embodiment. View multiplexers 204A-B are described in more detail below in conjunction with FIG. 3. Behind view multiplexers 204A-B is a layer 206 of transparent material such as plastic, glass, or a gas such as air, a polarizer 208, and a second layer 210 of transparent material.

Behind layer 210 is an array of color filters 212A-F, each of which imparts a red, green, or blue hue to a respective one of pixels 216A-F. Pixels 216A-F are vertical pixels.

Mask 214 is positioned between color filters 212A-F and pixels 216A-F and limits the perceived width of pixels 216A-F to about one-quarter their actual width, leaving dark space between pixels 216A-F for apparent pixels due to light deflection by operation of view multiplexers 204A-B. In this illustrative embodiment, the field of focus of lenticles 202A-C is at about mask 214.

Pixels 216A-F are positioned immediately behind mask 214. Each of pixels 216A-F is a single, independently controlled LCD sub-pixel, having its own independently controlled display intensity. The color of each of pixels 216A-F is controlled by a respective one of color filters 212A-F. Behind pixels 216A-F is another layer 218 of transparent material and a polarizer 220. Behind polarizer 220 is a light source (not shown) as is typical in conventional LCD displays. Polarizers 208 and 220 are similar to polarizers used in conventional LCD displays.

Figure 3:
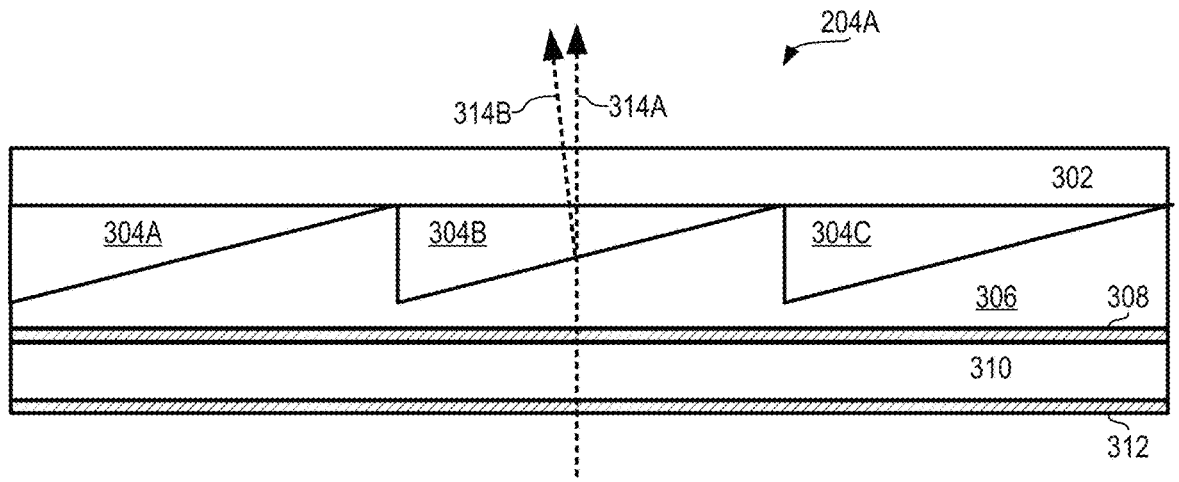
FIG. 3 is a plan view of a view multiplexer of the autostereoscopic display of FIGS. 1 and 2 in greater detail.

View multiplexer 204A is shown in greater detail in FIG. 3. Except as otherwise noted herein, view multiplexer 204B is directly analogous to view multiplexer 204A and the following description is also applicable to view multiplexer 204B.

View multiplexer 204A (FIG. 3) is shown in cross-section view from above and includes triangular columns 304A-C of birefringent material such as liquid crystal. Triangular columns 304A-C are positioned between a layer 302 of transparent plastic or glass and a grooved layer 306 of transparent plastic or glass into which triangular grooves are made to provide space for triangular columns 304A-C.

Behind layer 306 is a switch layer 310 of liquid crystal between electrode layers 308 and 312. By selectively applying a charge to electrode layers 308 and 312, polarization of light passing through switch layer 310 can be switched, e.g., between parallel and perpendicular orientations relative to the birefringent material in triangular columns 304A-C.

The birefringent material, its orientation set at manufacture, and the size and shape of triangular columns 304A-C are selected to provide one amount of light deflection with one polarization orientation of switch layer 310 and a different amount of deflection with the other polarization orientation of switch layer 310. In effect, the birefringent material in triangular columns 304A-C are prisms whose degree of light deflection vary according to the state of switch layer 310.

In this illustrative embodiment, the birefringent material is selected to have one refraction index substantially equal to the refraction index of the transparent material of layers 302 and 306, and therefore provides no deflection of light as shown by arrow 314A, for one polarization orientation of switch layer 310. In effect, the prisms of triangular columns 304A-C disappear into layers 302 and 306, and triangular columns 304A-C and layers 302 and 306 appear to be a single, flat layer of transparent material. However, it should be appreciated that it is not necessary that the prisms provide a deflection of zero degrees to effectively disappear into layers 302 and 306. As long as the prisms are controllable to provide one of at least two different angles of deflection, pixel 216A can be made to appear in one of at least two different, perhaps overlapping, locations and thus serve the purpose of time-multiplexing of pixel 216A.

For the other polarization orientation of switch layer 310 in this illustrative embodiment, the birefringent material, its orientation set at manufacture, and the size and shape of triangular columns 304A-C in view multiplexer 204A are selected to deflect light by 0.5 degrees as shown by arrow 314B, and the birefringent material, its orientation set at manufacture, and the size and shape of triangular columns 304A-C in view multiplexer 204B are selected to deflect light by 0.25 degrees. In effect, the different refraction index of the birefringent material with this polarization orientation and the dimensions of triangular columns 304A-C are prisms designed to reflect light by a predetermined desired angle, such as 0.5 degrees in view multiplexer 204A and 0.25 degrees in view multiplexer 204B in this illustrative embodiment.

Figure 5:
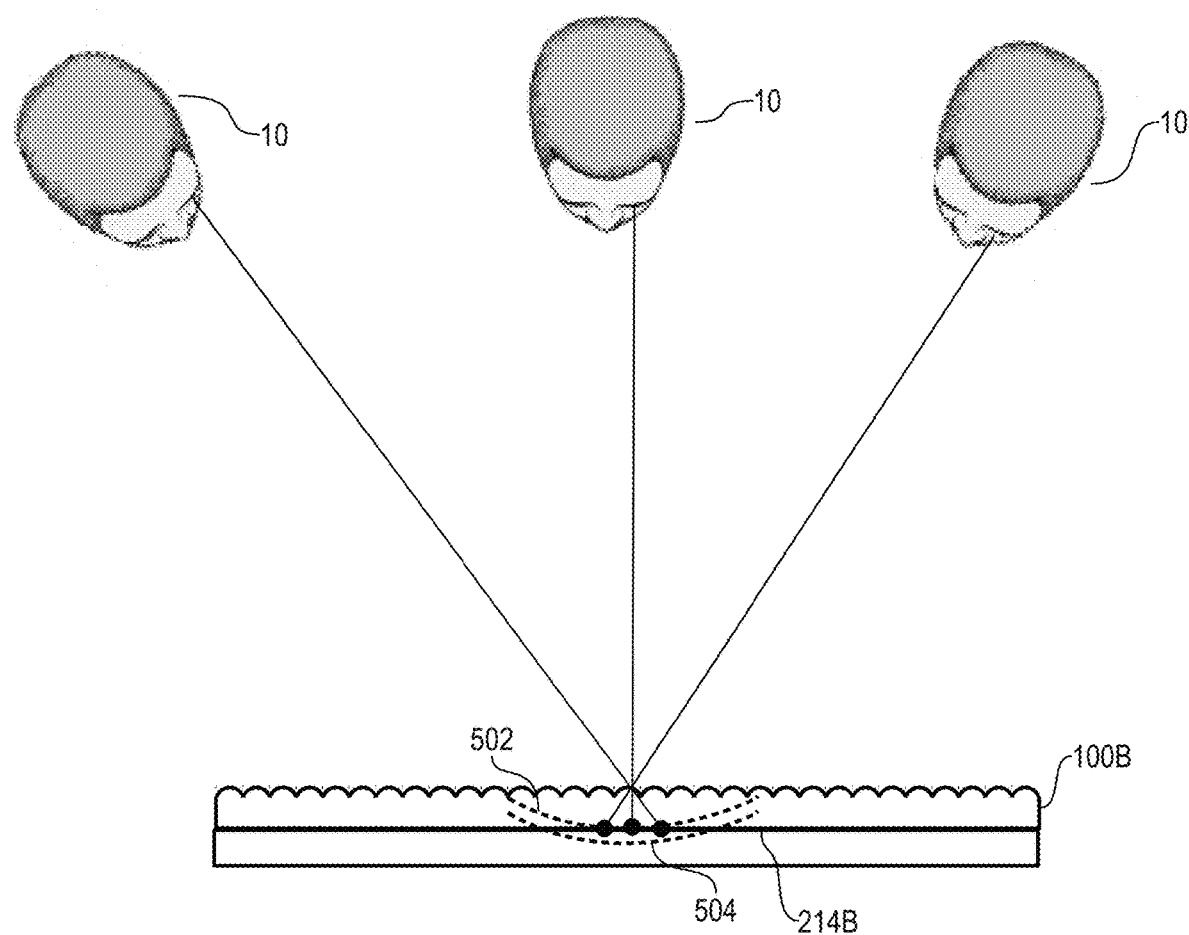
FIG. 5 is a plan view of an alternative autostereoscopic display in accordance with the present invention.

As described above, autostereoscopic display 100 includes a number of lenticles 202A-C that are designed to provide a relatively flat field. Another approach to reducing autostereoscopic image degradation due to curvature of field of conventional lenticles is illustrated by FIGS. 5 and 6.

Viewers 10 (FIG. 5) are viewing an autostereoscopic image displayed by autostereoscopic display 100B from various viewing angles. Autostereoscopic display 100B is an alternative embodiment to that of autostereoscopic display 100 and is directly analogous to autostereoscopic display 100 except as otherwise described herein. Autostereoscopic display 100B does not include meniscus-cylinder lenticles but instead includes lenticles of a more conventional design, having a convex proximal surface and a flat distal surface.

An autostereoscopic image is best viewed in very good focus. In the case of autostereoscopic display 100B, the focus target is mask 214B. However, viewing angles that stray significantly from directly perpendicular to autostereoscopic display 100B tend to be out of focus due to the curvature of field of some lenticles. This curvature of field is illustrated by curved line 502, which represents the locus of foci of the lenticle at various angles of perspective. To reduce loss of focus over a wider range of viewing angles, the lenticular array of autostereoscopic display 100B are focused slightly behind mask 214B to provide loci of focus along curved line 504.

Figure 6:
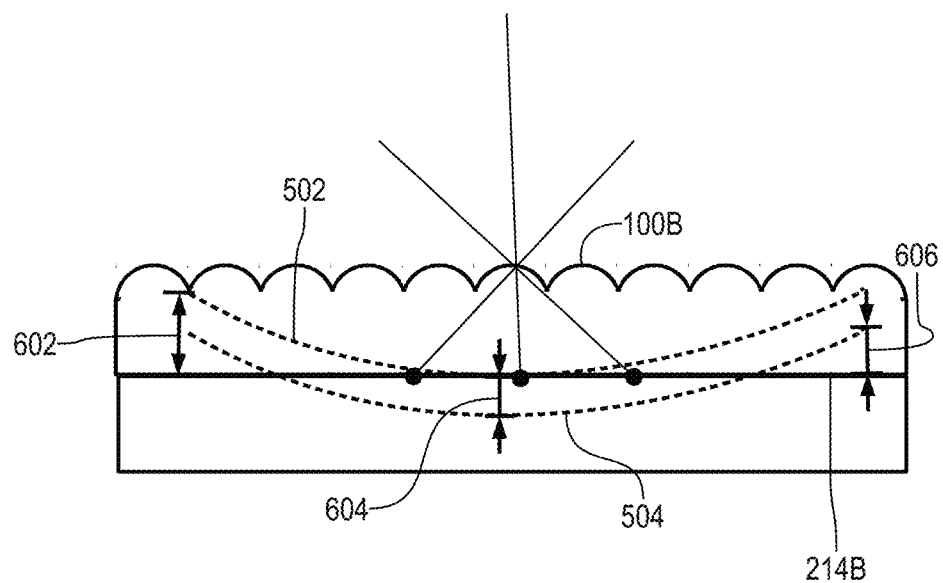
FIG. 6 is a plan view of a portion of the autostereoscopic display of FIG. 5 in greater detail.

A portion of autostereoscopic display 100B is enlarged in FIG. 6. Curved lines 502 and 504 are exaggerated to illustrate the focus errors therein.

Curved line 502 represents loci of focus provided by a lenticle in a typical conventional autostereoscopic display. Curved line 502 shows a very good focus, i.e., near zero focus error, for straight-on viewing angles, i.e., perpendicular to autostereoscopic display 100B. At a wider viewing angles, curved line 502 shows a noticeable focus error 602.

Figure 7:
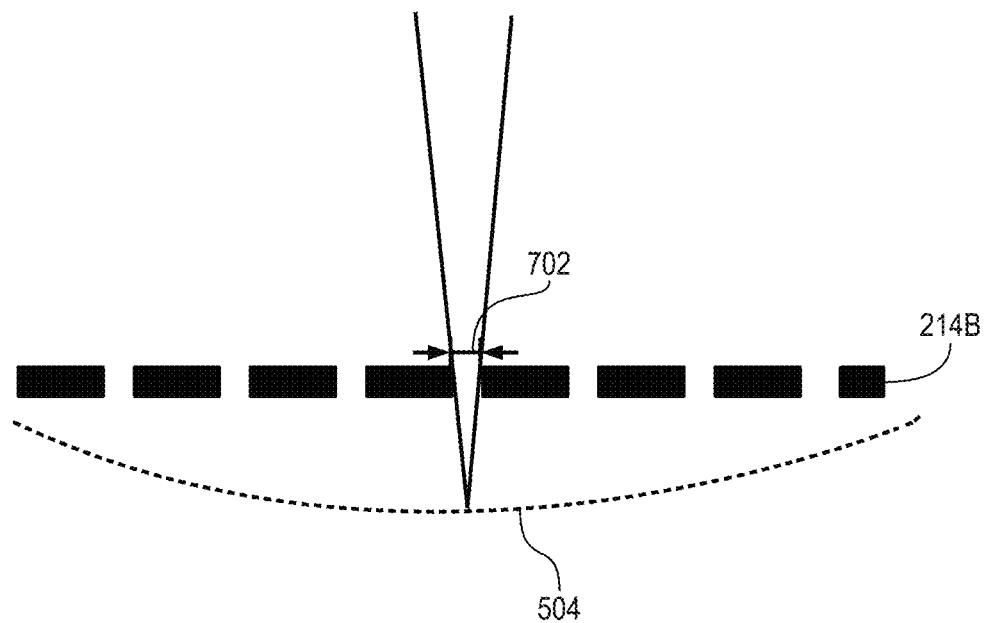
FIG. 7 is a plan view illustrating focus of the autostereoscopic display of FIGS. 5 and 6.

In this illustrative embodiment, lenticles of autostereoscopic display 100B are designed to focus behind mask 214B for straight-on viewing angles. As shown in FIG. 7, curved line 504 is behind mask 214B by an amount that, from viewing perspectives near perpendicular to mask 214, the focus of lenticles of autostereoscopic display 100B are blurred by a width 702 that is no more than the width of the gaps in mask 214B. Such limited blurring does not affect the accuracy of the autostereoscopic image perceived by viewer 10 because nothing other than the intended pixel is viewable to viewer 10 through each lenticle. Thus, the focus error 604 (FIG. 6) viewable at near perpendicular viewing angles is sufficiently small to not affect the perception of focus of viewer 10.

At wider viewing perspectives, curved line 504 intersects mask 214B to provide very good focus, yet no better than that perceivable by viewer 10 at near perpendicular viewing angles, and begins to blur at even wider viewing perspectives as curved line 504 is in front of mask 214B. The quality of view as perceived by viewer 10 is preserved at these wider viewing perspectives up to a focus error 606, beyond which the amount of blurring exceeds the width of gaps in mask 214B.

In some embodiments, maintaining focus errors no wider than gaps in mask 214B might allow for unacceptably large focus errors at wider angles of viewing perspective. Generally, best results are achieved by determining the width of blur over a range of viewing angles for which quality viewing is desired and selecting a lens and locus of foci whose width of blur is minimized over that range of viewing angles.

The result is that lenticles whose locus of foci are represented by curved line 504 provide a much wider range of acceptable viewing angles than do conventional lenticles.

Figure 8:
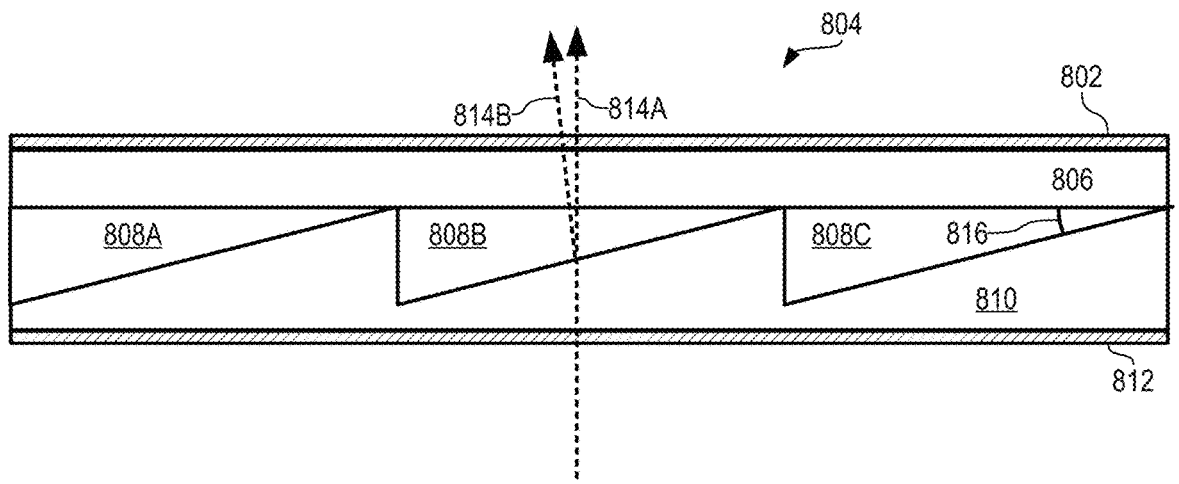
FIG. 8 is a plan view of an alternative view multiplexer in accordance with the present invention.

As described briefly above, a single view multiplexer 804 (shown in cross section view in FIG. 8) can sweep across a range of deflection angles to provide a number of views from a single pixel.

View multiplexer 804 includes triangular columns 808A-C of a material whose refraction index is controllable, e.g., by an electrical field. An example of such a material is liquid crystal. Triangular columns 808A-C are positioned between a layer 606 of transparent plastic or glass and a grooved layer 810 of transparent plastic or glass into which triangular grooves are made to provide space for triangular columns 808A-C.

In front of layer 806 is an electrode layer 802. Behind layer 810 is an electrode layer 812. By selectively applying a charge to electrode layers 802 and 812, the refraction index of the material in triangular columns 808A-C can be varied.

The material within triangular columns 808A-C, its orientation set at manufacture, and the size and shape of triangular columns 808A-C are selected to provide a desired range of deflection across the range of electrical fields that can be produced across electrode layers 802 and 812. In effect, the material in triangular columns 808A-C are prisms whose degree of light deflection vary according to the electrical field between electrode layers 802 and 812.

In this illustrative embodiment, the desired range of deflection is 0.0-2.0 degrees, the material within triangular columns 808A-C has a refraction index that varies from the refraction index of layers 806 and 810 to 0.1 above the refraction index of layers 806 and 810, and triangular columns 808A-C have a cross-sections that are right triangles with an angle 816 of 20 degrees.

Figure 9:
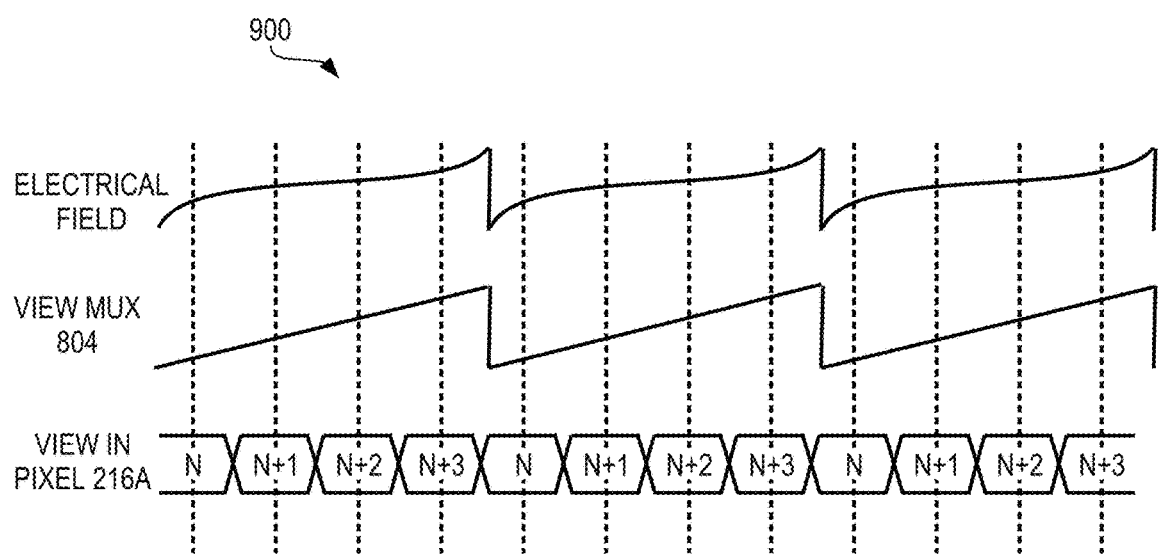
FIGS. 9 and 10 are timing diagrams illustrating time-multiplexing of a pixel using the view multiplexer of FIG. 8.

Timing diagram 900 (FIG. 9) illustrates the time-multiplexing of pixel 216A using view multiplexer 804. Timing diagram 900 shows an electrical field between electrode layers 802 and 812, the corresponding angle of deflection of view multiplexer 804, and various views displayed by pixel 216A. The angle of deflection provided by view multiplexer 804 sweeps through a predetermined range, e.g., 0-2.0 degrees. Pixel 216A displays pixels of views N through N+3 in a synchronized manner such that pixel 216A displays a pixel of view N while view multiplexer 804 sweeps through deflection angles 0.0-0.5 degrees, displays a pixel of view N+1 while view multiplexer 804 sweeps through deflection angles 0.5-1.0 degrees, displays a pixel of view N+2 while view multiplexer 804 sweeps through deflection angles 1.0-1.5 degrees, and displays a pixel of view N+3 while view multiplexer 804 sweeps through deflection angles 1.5-2.0 degrees, after which view multiplexer 804 returns to provide a deflection of 0 degrees and pixel 216A displays a pixel of the next frame of view N.

It should be appreciated that, while pixel 216A is shown to time-mulitplex only four (4) views, pixel 216A can time-multiplex many more views, limited only by the switching rate of pixel 216A relative to a desired frame rate. In embodiments in which pixel 216A is implemented using one or more LEDs, e.g., in very large signage, pixel 216A can switch much more rapidly than an LCD pixel and can time-multiplex many more views. For example, some LEDs can switch at frequencies of 2.0 MHz. Accordingly, a single LED (or a cluster of red, green, and blue LEDs) can provide 300 or more views of single pixel, limited only by the optical quality of lenticles 202A-C and the range of deflection angles and switching speed of view multiplexer 804.

Figure 10:
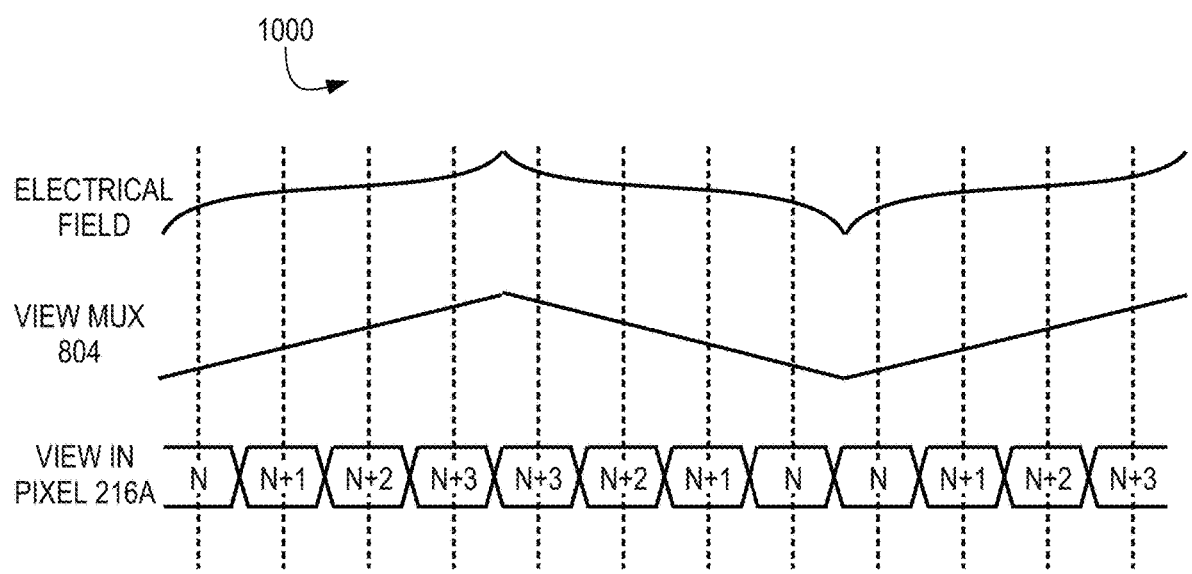

Timing diagram 1000 (FIG. 10) shows an alternative manner in which view multiplexer 804 can time-multiplex pixels of multiple views shown by pixel 216A. Once view multiplexer 804 sweeps through a range of deflection angles, e.g., 0-2.0 degrees, view multiplexer 804 sweeps back through the range in reverse direction, e.g., from 2.0 degrees to 0 degrees. In a synchronized manner, once pixel 216A switches through pixels of views N, N+1, N+2, and N+3, pixel 216A switches through pixels of a subsequent frame in reverse order, i.e., through views N+3, N+2, N+1, and N.

If should be appreciated that view multiplexer 804 can cycle through angles of deflection in other ways, including stepped patterns. In addition, multiple instances of view multiplexer 804 can be stacked as are view multiplexers 204A-B (FIG. 2) to provide greater ranges of cumulative deflection angles.

The view multiplexer may also be used for purposes not involving autostereo, and most, but not all, of the same basic technology makes possible additional applications. Using the view multiplexer without a lenticular lens, but in precisely the same manner as described herein, will result in a normal two-dimensional image with increased pixel density. Also, by using a prism structure within the device that has a steeper slope, and thus a wider angle of deflection, and also using the device without a lenticular lens, it may be used for the purpose of creating a projected image with a wider field of view (i.e. the additional multiplicity of pixels would be used to extend the image to either the left or the right of the original, underlying display), or of creating two projected images running in time sequence from the same display (such as to show a right and a left view, positioned some distance apart, for two-view stereo viewing in a head-mounted near-eye display). In conjunction with a camera, similar effects may be attained in capturing a wider field of view or multiple views. By placing the view multiplexer in line with a camera or projector, or with the naked eye, images can be captured or displayed having characteristics greater than those captured or displayed solely by the camera or projector. Example characteristics include a wider field of view, increased pixel density, adjusted diffraction characteristics, correction of pixel positioning in underlying displays, adjusted focus, and the like.

As a first example, a camera or projector, or a simple beam of light, may have a predefined field of view or projection. For example, a camera may have a field of view of 35 degrees, 50 degrees, 100 degrees, or the like. The system may generate an image having a greater field of view by adjusting an angle of the view multiplexer and then capturing the image or view when the angle of the view multiplexer is adjusted. For example, the angle of the view multiplexer may be adjusted to an angle such that the image sensor of the camera is aimed straight ahead, but the image center that is captured is of a scene 45 degrees from objects which are perpendicular to (i.e. directly in front of) the image sensor. In this way, the view multiplexer functions as a kind of periscope. When the multiple views of the view multiplexer, at different angles, are synchronized with multiple camera exposures, the camera may take a series of pictures which may be used as slices of an overall image with a much larger field of view than is otherwise possible to capture with a single sensor. In another application, the overall field of view created by multiple captures synchronized to changed angles of the view multiplexer may remain within the total field of view that might be captured by a lens unaided by the view multiplexer, but the picture thus created by stitching together multiple images captures with the aid of the view multiplexer will contain a multiplied image resolution, or pixel density, than otherwise attainable. This application is exactly analogous to the increased pixel density for the application of autostereo display already detailed. Thus a camera would be capable, with the aid of the view multiplexer, of generating images that can be zoomed in on electronically, without resolution loss.

The system can also take multiple images where the view multiplexer is adjusted to different angles during each exposure or image capture. The system may automatically identify the appropriate angle. For example, a user may indicate that a picture having a particular field of view is desired. The system may then calculate the angles of the view multiplexer to generate the image having the desired field of view. When the user or system activates the shutter of the camera, the system may adjust the angle of the view multiplexer to cause each image or exposure to have different fields of view, based on the deflection position of the view multiplexer. As before, the deflection position may include a deflection position that is past the field of view or focus of the camera. Once the necessary or desired number of images is captured, the system can stitch the images together to generate a single image having a field of view wider than the field of view of the camera.

A similar system can be incorporated with a projector, or with any underlying display to be used to generate images to be presented at some distance from the display, such as in near-eye displays using waveguide to carry images from displays located at some distance and/or a normally unviewable angle from the eyes. In such a system the view multiplexer would be coupled to the projector or underlying display. As the projector or display shows images, the view multiplexer could sweep images across a wide range of positions creating a video showing images with a wider field of view than typical. For example, the angle of the view multiplexer could be synchronized with the playing of the images of the projector/underlying display. As the projector or display displayed new images, the view multiplexer would sweep across a plurality of deflection angles to show each of the images at different angles, thereby creating the effect that each image has a field of view greater than what could typically be displayed. More than one view multiplexer could be stacked to increase the maximum sweep angle of the system. For example, if each view multiplexer could sweep across a 2 degree range, two multiplexers stacked could sweep across a 4 degree range. Also, the angles of deflection of the prisms located within the view multiplexer, as already detailed, could be increased to attain the same greater range as might be achieved with more than one stacked view multiplexer. The combination of greater angles of deflection in a given stacked view multiplexer, and multiple stacked view multiplexers, would allow for a system displaying up to 360 degrees.

Such a system would also be capable of showing alternating left and right eye views to vantage points appropriate to each eye, from a single underlying display, such that stereo is perceived. Equally, if a field-sequential color display is the image source, or other data are extracted from a single image, the system would be capable of showing red. Green and blue signals (in the case of a field sequential display) or specialized image data (such as a depth map, or a luminance signal, for two examples), could thus be sent to different viewing locations.

As another example, the predefined characteristic of a camera capture service may include a pixel density. In other words, the camera may have a set pixel density that images are captured at. The view multiplexer could increase the total pixel density of the captured images, resulting in an image that could be zoomed in on without a decrease in the resolution of the image. The view multiplexer may be synchronized with the system such that 2, 4, or more horizontal or vertical pixels are created in the space normally allotted to one pixel. This is similar to the technique discussed above where a single physical pixel is subdivided into subpixels. To accomplish this effect, the system would take two or more images in rapid succession. Each of the images would be at a slightly different view multiplexer deflection angle, resulting in two images that were very similar with a very slight different in viewing angle.

The system can then stitch together the images to generate a single image. The system can take image information from each of the captured images to fill in information between two original pixels. As an example, using only the camera, the image may include Pixel A and Pixel B. By capturing the two images at slightly different angles, the system can fill in the information between the Pixel A and Pixel B. Thus, the system divides each of the original pixels into sub-pixels and fills in the information for the sub-pixels using information obtained from the multiple captured images. The resulting image has a greater resolution than the pixel count of the imager of the camera.

As before, a similar system can be used with a projector to display images having a greater pixel density. This system would be similar to those discussed before with respect to the flat panel displays (e.g., televisions, billboards, etc.). However, rather than being attached to a flat panel display, this system would be attached to a projector. Thus, the light from the projection would go through the view multiplexer with a small sweep in angles to increase the pixel density of the image displayed to a viewer. This can also be used to display an autostereoscopic image to the viewers.

In another example, the desired effect may include specific diffraction characteristics. The prism structure within the view multiplexer, as described herein, is actually a commonly defined blazed diffraction grating. Application of voltage to the liquid crystal material can change the effective slope, height, and/or periodicity of the prism array. This may be done to adjust the diffraction effect so as to limit it when diffraction is unwanted, or to emphasize it when diffraction is desired. Specifically applied voltage may also be used to change the diffraction effect in time with the changing images presented by an underlying display. For example, a field sequential display may be used to present successive images that are green, red and blue. The view multiplexer may be synchronized with each color such that it grates for the wavelength of each color in sequence, in order to pass those colors through an optical waveguide, or for other applications.

Similarly, the adjustability may be deployed to correct for inaccurately manufactured plastic or glass gratings. This would be accomplished by applying differential voltage to different areas of the prism array, as required to create a uniform array.

Similarly, differential voltage may be applied to different areas of the view multiplexer to correct for inaccurate pixel alignment in an underlying display—as is typical in displays assembled from multiple modules.

Similarly, the adjustable diffraction grating made possible by changed voltage in the view multiplexer may be used in conjunction with a camera. As the grating frequency and amplitude are adjusted for different diffractions, and are calibrated for specific light sources (such as the flash built into the camera, or such as an ultra-violet light), the camera can be turned into a spectrometer for sensing gas leaks, color calibrating printers, diagnostics for skin ailments, and the like. In this case, the multiplexer would not need to be closely synchronized with the shutter of the camera, but merely to be running while the shutter is open. In this case, the diffraction setting (i.e., the voltage of the multiplexer) would be set to operate while the camera shutter is open, and then change to other settings, as required, when the shutter may be open again in order to measure other phenomena.

In another use case, differential adjustment of applied voltage to different areas of the view multiplexer can allow it to be used as a focusing lens. An original form of a focusing lens may be designed into the molded or etched prism structure made of plastic or glass that is enclosed within the liquid crystal cell, typically taking the form of a Fresnel pattern so that the prisms may be of uniform enough, and short enough, size so as to fit within the maximum usable cell gap. The liquid crystal prism structures thus bounded by this plastic or glass structure may then have its shape adjusted by voltage so as to change the prescriptive characteristics of the lens. This adjustment may be permanent (whenever voltage is applied, an may also be adjustable, either in a synchronized sequence with information to be viewed, or to adjust the lens for different viewers and different viewing conditions.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A system, comprising:
    a camera capturing images having predefined characteristics;
    a view multiplexer attached to the camera, wherein the view multiplexer enhances at least one of the predefined characteristics of the camera at a time interval, wherein the predefined characteristic comprises at least one of: a field of view of the camera, a diffraction characteristic, a pixel density, and a focusing effect, wherein the enhanced characteristic creates a wider field of view, wherein the view multiplexer comprises a lens of the camera, wherein the view multiplexer is synchronized with a shutter of the camera;
    at least one processor operatively coupled to the camera and view multiplexer; and
    a memory storing instructions executable by the processor to:
    adjust an angle of the view multiplexer to show one or more pixels at the time interval causing the user to see the one or more pixels in a location corresponding to the one or more pixels being shown, wherein the one or more pixels being shown is based upon the time interval; and
    capture, using the camera in conjunction with the view multiplexer having the adjusted angle at the time interval, at least one image having at least one enhanced characteristic, wherein the image is captured through the view multiplexer.

2. The system of claim 1, wherein to adjust the angle of the view multiplexer comprises adjusting a voltage of the view multiplexer.

3. The system of claim 1, wherein to adjust an angle of the view multiplexer comprises adjusting a deflection position past a focus field of the camera.

4. The system of claim 1, wherein to capture comprises capturing a plurality of exposures wherein each of the plurality of exposures comprises a different angle of the view multiplexer.

5. The system of claim 4, further comprising to generate a panoramic image by stitching the plurality of exposures together.

6. The system of claim 1, wherein one of the predefined characteristics comprises a pixel density and wherein the view multiplexer increases the pixel density.

7. The system of claim 6, wherein to capture comprises capturing a plurality of images in succession, each of the images having a view multiplexer angle different from the image previously captured.

8. The system of claim 7, further comprising to generate an image having an increased pixel density by stitching the plurality of images together.

9. The system of claim 1, wherein the camera comprises a camera integral to a user electronic device.

10. The system of claim 1, wherein the enhancing a diffraction characteristic comprises the view multiplexer increases, decreases or otherwise adjusts a diffraction effect.

11. The system of claim 1, wherein the enhancing a focusing effect comprises the view multiplexer adjusts a focusing effect.

12. A method, comprising:
    capturing, using a camera in conjunction with a view multiplexer attached to the camera, at least one exposure at a time interval, wherein the exposure comprises a view having a field of view wider than a field of view of the camera, wherein the view multiplexer comprises a lens of the camera, wherein the view multiplexer is synchronized with a shutter of the camera;
    wherein the capturing comprises:
    identifying a focus field of the camera;
    adjusting an angle of the view multiplexer to show one or more pixels at the time interval causing the user to see the one or more pixels in a location corresponding to the one or more pixels being shown, wherein the one or more pixels being shown is based upon the time interval, wherein the angle of the view multiplexer comprises a deflection position past the focus field of the camera, wherein the predefined characteristic comprises at least one of: a field of view of the camera, a diffraction characteristic, a pixel density, and a focusing effect, wherein the enhanced characteristic creates a wider field of view; and
    capturing the at least one exposure with the view multiplexer at the adjusted angle at the time interval, wherein the at least one exposure is captured through the view multiplexer.

13. The method of claim 12, wherein the at least one exposure comprises a plurality of exposures and wherein each of the exposures comprises an exposure where the view multiplexer is at a different angle.

14. The method of claim 13, comprising generating a panoramic image by stitching the plurality of exposures together.

* * * * *